(12) United States Patent
Sasaki et al.

(10) Patent No.: US 9,017,858 B2
(45) Date of Patent: Apr. 28, 2015

(54) CONDUCTOR FOR CONNECTING TERMINALS COMPRISING PLATE-SHAPED PARTS, ASSEMBLED BATTERY, AND METHOD FOR PRODUCING ASSEMBLED BATTERY

(75) Inventors: Takeshi Sasaki, Kyoto (JP); Masakazu Tsutsumi, Kyoto (JP); Yoshinori Tanaka, Kyoto (JP); Shinsuke Yoshitake, Kyoto (JP)

(73) Assignee: GS Yuasa International Ltd., Tokyo (JP)

( * ) Notice: Subject to any disclaimer, the term of this patent is extended or adjusted under 35 U.S.C. 154(b) by 355 days.

(21) Appl. No.: 13/138,327

(22) PCT Filed: Feb. 1, 2010

(86) PCT No.: PCT/JP2010/051333
§ 371 (c)(1),
(2), (4) Date: Aug. 2, 2011

(87) PCT Pub. No.: WO2010/087472
PCT Pub. Date: Aug. 5, 2010

(65) Prior Publication Data
US 2011/0293995 A1  Dec. 1, 2011

(30) Foreign Application Priority Data
Feb. 2, 2009 (JP) .................................. 2009-021690

(51) Int. Cl.
H01M 2/20 (2006.01)
H01M 2/22 (2006.01)
H01M 2/24 (2006.01)
H01M 2/30 (2006.01)
H01M 6/42 (2006.01)

(52) U.S. Cl.
CPC .................................. H01M 2/202 (2013.01)

(58) Field of Classification Search
USPC .................................. 429/158, 149, 156, 160
See application file for complete search history.

(56) References Cited

U.S. PATENT DOCUMENTS 3,882,265 A * 5/1975 Johnston et al. ............. 174/88 B
2004/0241542 A1* 12/2004 Nakamura et al. ............ 429/181
2011/0081568 A1* 4/2011 Kim et al. ..................... 429/158

FOREIGN PATENT DOCUMENTS

| JO | 2003-151527 A | 5/2003 |
| JP | 09-330696 A | 12/1997 |
| JP | 2002-075324 A | 3/2002 |
| JP | 2002-151045 A | 5/2002 |

(Continued)

OTHER PUBLICATIONS

Sawa et al., Machine translation of JP 2002-151045 A, May 2002.*

(Continued)

*Primary Examiner* — Sean P Cullen
(74) *Attorney, Agent, or Firm* — Rader, Fishman & Grauer PLLC

(57) ABSTRACT

A conductor for connecting first and second terminals includes a first plate-shaped part made of a first metal, a second plate-shaped part made of a second metal, a first region with the first metal exposed, and a second region with the second metal exposed. The second metal is also exposed at a third region which is opposite to the second region. A boundary between the first and second regions has no step difference in a thickness direction, and the first plate-shaped part is directly connected to the first terminal.

16 Claims, 3 Drawing Sheets

(56) References Cited

FOREIGN PATENT DOCUMENTS

| | | |
|---|---|---|
| JP | 2002-352863 A | 12/2002 |
| JP | 2002-358945 A | 12/2002 |
| JP | 2003-123733 A | 4/2003 |
| JP | 2007-280898 A | 10/2007 |
| JP | 2007-323952 A | 12/2007 |

OTHER PUBLICATIONS

Maruyama, N., Machine translation of JP 2007-280898 A, Oct. 2007.*
Enomoto et al., Macine translation of JP 2002-358945 A, Dec. 2002.*
International Search Report mailed on May 18, 2010.

* cited by examiner (a)　　　　　　　　(b)

CONDUCTOR FOR CONNECTING TERMINALS COMPRISING PLATE-SHAPED PARTS, ASSEMBLED BATTERY, AND METHOD FOR PRODUCING ASSEMBLED BATTERY

TECHNICAL FIELD

The present invention relates to a conductor for connecting terminals to connect terminals and the like, to each other, of a plurality of batteries, an assembled battery provided by connecting the terminals, to each other, of the plurality of the batteries by the conductors for connecting terminals, and a method for producing the assembled battery provided by connecting the terminals, to each other, of the plurality of batteries by the conductors for connecting terminals.

The conductor for connecting terminals according to the present invention can be preferably used in an assembled battery provided by connecting terminals, to each other, of non-aqueous electrolyte secondary batteries having a positive-electrode terminal made of aluminum, etc.

BACKGROUND ART

As a component material of the positive-electrode terminal in the non-aqueous electrolyte secondary battery, aluminum or an aluminum alloy which is not soluble in non-aqueous electrolyte at a positive electrode potential is preferably used. In addition, as a component material of a negative-electrode terminal, copper which is not alloyed with a negative-electrode active material is used in many cases.

However, in the case where the positive-electrode terminal including the aluminum and the like is connected to the negative-electrode terminal of another non-aqueous electrolyte secondary battery or a terminal of an external device through a conductor for connecting terminals including copper, nickel, or iron, etc. the positive-electrode terminal cannot be easily welded to the conductor for connecting terminals because the aluminum, etc. is lower in melting point and is higher in specific heat capacity than the copper, nickel or iron, etc. is.

In addition, for the similar reason, in the case where the conductor for connecting terminals including aluminum, etc. is used, the conductor for connecting terminals cannot be easily welded to a positive-electrode terminal including copper, etc. and the negative-electrode terminal including copper, nickel, or iron, etc.

Therefore, as shown in FIG. 2 in Patent document 1, the well-known conventional method is disclosed in which a current extracting lead plate including a clad material having two-layer structure provided by attaching an aluminum layer and a nickel layer is arranged so as to abut on a bottom part of an exterior can of a battery whose aluminum layer includes aluminum, and fixed thereto by welding and the like.

According to this method, the nickel layer of the current extracting lead plate can easily be welded to a connecting lead plate serving as a conductor for connecting terminals made of another metal such as copper, nickel, or iron, so that the bottom part of the exterior can and the connecting lead plate can be surely connected to each other through the current extracting lead plate.

In addition, in the case where the positive-electrode terminal including aluminum has a part which includes copper, nickel, or iron and projects outward from the battery exterior case, the part can be welded to the positive-electrode terminal through the nickel layer of the current extracting lead plate.

In addition, as shown in FIG. 6, Patent document 2 discloses a method for connecting non-aqueous electrolyte secondary batteries in series through a conductor for connecting terminals serving as conductor for connecting terminals 5 provided by attaching an aluminum plate 5a and a copper plate 5b across the board. The conductor for connecting terminals 5 is provided such that the aluminum plate 5a and the copper plate 5b are pressed through a mill roll while being heated at a predetermined temperature.

It is disclosed that, corresponding to a positional relationship between the two terminals to be connected, the conductor for connecting terminals 5 is twisted or bent so as to reverse the positional relationship between the aluminum plate and the same plate to allow the aluminum plate 5a of the conductor for connecting terminals 5 to be brought in contact with a positive-electrode terminal 1 including aluminum and the like, and allow the copper plate 5b to be brought in contact with a negative-electrode terminal 4 including copper and the like, and they are welded, respectively.

Patent Document

Patent document 1: Japanese Unexamined Patent Publication No. 9-330696

Patent document 2: Japanese Unexamined Patent Publication No. 2002-151045

DISCLOSURE OF THE INVENTION

However, in the case of the non-aqueous electrolyte secondary battery including the positive-electrode terminal including aluminum or an aluminum alloy and the negative-electrode terminal including copper or nickel, etc. since aluminum is low in melting point and high in specific heat capacity compared with copper, nickel, or iron, the problem is that it is difficult to surely weld the negative electrode to the conductor for connecting terminals including aluminum, and it is difficult to surely weld the positive electrode to the conductor for connecting terminals including copper.

It is an object of the present invention to solve the problem that when the terminals of the batteries are connected to each other through the conductor for connecting terminals, there is difficulty in welding due to a difference in melting point between a metal constituting the conductor for connecting terminals and a metal constituting the positive-electrode terminal or negative-electrode terminal.

In addition, according to the technique disclosed in Patent document 1, since it is necessary to previously connect and fix the current extracting lead plate to the bottom part of the exterior can before the connecting lead plate serving as the conductor for connecting terminals is connected to the current extracting lead plate including the clad material, the problem is that production cost of the non-aqueous electrolyte secondary battery is high.

Also, in the case where the positive-electrode terminal including aluminum has the part which includes copper, nickel, or iron and projects outward from the battery exterior case, welding or brazing needs to be performed in the step of producing the positive-electrode terminal, and the problem is that the production cost is also high.

It is an additional object of the present invention is to simplify a step of connecting the electrode terminals of batteries with the conductor for connecting terminals, thereby decreasing production cost.

The inventors have found the problem that when the electrode terminals of the batteries are connected through a conductor for connecting terminals 5 including the two-layer clad material formed all over in the longitudinal direction as shown in FIG. 6, preferable welding to one electrode terminal can be performed, but preferable welding to the other electrode terminal cannot be performed.

Hereinafter, a detailed description will be made. The inventors tried resistance welding by bringing the aluminum plate 5a of the conductor for connecting terminals 5 in contact with a positive-electrode terminal 1 including aluminum, etc. of the one battery and sandwiching both of them by welding heads 6 and 6, and also tried resistance welding by bringing the copper plate 5b of the conductor for connecting terminals 5 in contact with a negative-electrode terminal 4 including copper, etc. in the other battery and sandwiching both of them by the welding heads 6 and 6.

As a result, it has been found that the resistance welding can be easily performed between the positive-electrode terminal 1 and the conductor for connecting terminals 5, but regarding the welding between the conductor for connecting terminals 5 and the negative-electrode terminal 4, the welding cannot be sufficiently performed between the negative-electrode terminal 4 and the copper plate 5b because the aluminum plate 5a having a melting point lower than that of the copper plate 5b melts before the welding is performed between the negative-electrode terminal 4 and the copper plate 5b.

It is an additional object of the present invention to enhance connection strength and to reduce electric resistance by ensuring welding between both terminals of the positive electrode and the negative electrode, and the conductor for connecting terminals.

In addition, in the case where a plate material including a metal having a low melting point is overlapped with a plate material including a metal having a melting point higher than the above, and a size of the former is smaller than a size of the latter, a step difference corresponding to a thickness of the former plate material is formed at a boundary between both plate materials. The inventors have found that electric corrosion is caused by attachment and accumulation of water droplets at the boundary, and further found that the accumulation of the water droplets is caused by the step difference. Note that the electric corrosion is a corrosion phenomenon due to an electrochemical reaction caused by water droplets interposed between different metals.

It is an additional object of the present invention to prevent the conductor for connecting terminals from deteriorating due to the electric corrosion.

As for the assembled battery, it is necessary to control a temperature with high precision in order to keep performance of each battery constituting the assembled battery. In general, it is required to perform efficiently cooling, so that the battery exterior case is designed to be thin.

However, according to the conventional assembled battery, the problem is that the battery exterior case cannot be sufficiently thinned. Because, when the battery exterior case is thinned, the batteries cannot be well connected to each other.

A conventional structure to connect the batteries mainly employs a structure in which an upper surface of the positive-electrode terminal and an upper surface of the negative-electrode terminal are coupled with the conductor for connecting terminals. Therefore, there arises the problem that, as the battery exterior case becomes thin, the upper area of the terminal becomes small, and as a result, a contact area with the conductor for connecting terminals cannot be sufficiently ensured, or a screw hole for fastening a bolt cannot be processed, so that there is a limit to thinning of the battery exterior case.

In addition, in the case where the terminal and the conductor for connecting terminals are fastened with the bolt, as for a automotive assembled battery which requires high vibration endurance, a diameter of the bolt is required to be 5 mm or more (M5 size or more) with a view to increasing connection strength, but when the thickness of the terminal becomes 5 mm or less, the screw hole cannot be processed.

It is an additional object of the present invention to allow the battery to be designed to be thin.

Furthermore, as for a vehicle equipped with the assembled battery, it is necessary to correctly control a temperature of the battery in order to maintain charge-discharge performance of the assembled battery. Therefore, the battery exterior case is designed to be thin, but as it is thinned, the connection strength is problematically lowered. Therefore, it has been recognized that there is a trade-off relationship between the connection strength and the battery thickness.

In addition, the vehicle equipped with the assembled battery has the problem that the electric corrosion is generated in a connection part of the conductor for connecting terminals constituted by connecting different kinds of metals. The inventors have found that this problem arises as a prominent phenomenon in an automobile used in a cold region. In a case where after being used under a low-temperature atmosphere, the automobile is parked in a high-temperature garage, etc., dew condensation occurs in the part of the conductor for connecting terminals of the assembled battery. Especially, in an inshore area, since a component of seawater is contained in the air and soluble in dew condensation water, it has been found that the corrosion is prominently generated even though the dew condensation amount is small.

It is an additional object of the present invention to provide a vehicle equipped with an assembled battery including a plurality of thin type batteries. In addition, it is an additional object of the present invention to provide a vehicle equipped with an assembled battery in which deterioration due to the electric corrosion is suppressed.

In accordance with an aspect of the present invention, there is provided a conductor for connecting terminals being formed in such a manner that at least a plate-shaped part including a first metal, and a plate-shaped part including a second metal having a melting point higher than that of the first metal are overlapped with each other, a first region having the exposed first metal, and a second region having the exposed second metal are formed on one surface, the second metal is formed so as to be exposed to a region opposed to the second region, in the other surface, and there is substantially no step difference at an interface between the first region and the second region in a thickness direction.

According to the above conductor for connecting terminals, a first region formed on the one surface of the conductor for connecting terminals and having an exposed first metal having a low melting point can be easily and surely welded to a terminal, and a second region formed on the one surface of the conductor for connecting terminals and having an exposed second metal having a high melting point, or a region opposed to the second region, in the other surface and having the exposed second metal can be easily and surely welded to the terminal with sufficient strength.

In addition, according to the conductor for connecting terminals of the present invention, since there is substantially no step difference at the boundary between the first region and the second region of the conductor for connecting terminals, the conductor for connecting terminals is prevented from deteriorating due to the electric corrosion.

The mechanisms provided by substantially eliminating the step difference are as follows. The water droplet is not attached to the boundary between the first region and the second region. Even when water droplets are attached, the water droplets can be easily moved to another place because there is no step difference. Since the step difference which prevents an air current to be forcedly applied to cool down the battery does not exist, water can be smoothly evaporated with the air current. A contact area between the water droplets and the boundary part is small compared with the case where the step difference exists, and electron transfer resistance increases because an electron transfer distance between the different kinds of metals increases, whereby a corrosion reaction is prevented from being progressed.

Furthermore, since the same shape as that of the conductor for connecting terminals conventionally used can be realized, it is not necessary to change specifications such as a special shape in the battery having a defect and serving as a connection target, and a connection operation of the terminal does not require a special procedure or jig.

In the case where the conductor for connecting terminals of the present invention is used for connecting the non-aqueous electrolyte secondary batteries, for example, the battery can be used with the conductor for connecting terminals arranged between the side face of the positive-electrode terminal including aluminum or aluminum alloy, and the side face of the other terminal including the metal having a melting point higher than that of the aluminum or aluminum alloy. That is, the conductor for connecting terminals can be surely welded to each terminal.

According to the conductor for connecting terminals of the present invention, the first region formed on the one surface preferably includes an aluminum material part made of aluminum or an aluminum alloy, and the second region formed on the one surface or the region opposed to the second region, in the other surface preferably includes a material such as a metal having a melting point higher than that of the aluminum or aluminum alloy.

The aluminum material part is brought into contact with the positive-electrode terminal of the non aqueous electrolyte secondary battery and connected and fixed thereto strongly by welding, and a part other than the aluminum material part of the conductor for connecting terminals is brought in contact with the other terminal and connected and fixed thereto strongly by welding.

In accordance with another aspect of the present invention, there is provided an assembled battery including: at least two batteries each having a battery container, and a positive-electrode terminal and a negative-electrode terminal projecting upward from the battery container, and a conductor for connecting terminals formed in such a manner that at least a plate-shaped part including a first metal, and a plate-shaped part including a second metal having a melting point higher than that of the first metal are overlapped with each other, a first region having the exposed first metal, and a second region having the exposed second metal are formed on one surface, and the second metal is formed so as to be exposed to a region opposed to the second region, in the other surface, wherein the batteries are arranged in such a manner that side faces having a largest area of side faces of the battery containers are opposed, and the conductor for connecting terminals is arranged between a terminal of one battery and a terminal of the other battery, the first region of the conductor for connecting terminals is connected to an opposed face of the terminal of the one battery, and the second region or the region opposed to the second region, in the other surface is connected to an opposed face of the terminal of the other battery.

According to the above assembled battery, when the side faces of the terminals of the batteries are connected through the conductor for connecting terminals, strong and sure welding to both terminals can be performed, and the battery can be designed to be thinner. Especially, it has been recognized that the connection strength and the battery thickness have the trade-off relationship, but according to the present invention, the high-level connection strength to satisfy the specification of the assembled battery to be mounted on an automobile can be ensured, and the battery thickness can be designed to be thin to the level in which preferable cooling characteristics can be ensured.

According to the assembled battery of the present invention, it is preferable that the plurality of non-aqueous electrolyte secondary batteries are used, and it is preferable that the terminals of the batteries are connected in series with the conductors for connecting terminals of the present invention.

The configuration of a vehicle of the present invention is characterized by including the assembled battery having the above characteristics.

In accordance with still another aspect of the present invention, there is provided a method for producing an assembled battery, using a conductor for connecting terminals formed in such a manner that at least a plate-shaped part including a first metal, and a plate-shaped part including a second metal having a melting point higher than that of the first metal are overlapped with each other, a first region having the exposed first metal, and a second region having the exposed second metal are formed on one surface, and the second metal is formed so as to be exposed to a region opposed to the second region, in the other surface, and including: a step of arranging the conductor for connecting terminals and a terminal of a battery in such a manner that the first region is brought in contact with the terminal of the battery, arranging a pair of welding heads so as to sandwich the terminal of the battery and the conductor for connecting terminals, and applying a current from the welding head to the conductor for connecting terminals and the terminal of the battery, and a step of arranging the conductor for connecting terminals and a terminal of another battery in such a manner that the second region or the region opposed to the second region, in the other surface is brought in contact with the terminal of the other battery, arranging a pair of welding heads so as to sandwich the terminal of the other battery and the conductor for connecting terminals, and applying a current from the welding head to the conductor for connecting terminals and the terminal of the other battery.

According to the method for producing the assembled battery of the present invention, in the case where the terminals of the batteries are connected to each other with the conductor for connecting terminals, strong and sure welding to both terminals can be realized.

Furthermore, since the conductor for connecting terminals can be easily welded to the positive-electrode terminal and the other terminal, steps of connecting the terminals of the batteries using the conductor for connecting terminals can be simplified.

Therefore, the step of welding the conventional current extracting lead plate, and the step of processing the outward projection part so that the part includes copper, nickel, or iron, in the positive-electrode terminal including aluminum can be omitted, and workability in connecting and fixing the terminals of the batteries can be enhanced.

The conductor for connecting terminals of the present invention can be strongly and surely welded to the positive-electrode terminal and the negative-electrode terminal of the batteries. In addition, when being formed in such a manner that there is substantially no step difference in the thickness direction at the boundary between the first region and the second region, the conductor for connecting terminals can be effectively prevented from deteriorating due to the electric corrosion.

According to the method for producing the assembled battery of the present invention, the step of connecting the terminals of the batteries with the conductor for connecting terminals can be considerably simplified, and production cost of the assembled battery can be reduced. In addition, the battery used in the assembled battery can be designed to be thinner.

According to the present invention, since each battery of the assembled battery can be formed into the thin type, a space for setting the assembled battery can be saved, so that the vehicle can mount the assembled battery having higher capacity than the assembled battery in the same space.

EXPLANATION OF REFERENCES

1: POSITIVE-ELECTRODE TERMINAL
2: LEAD PLATE
2A: PLATE-SHAPED PART
2B: PLATE-SHAPED PART
3: PLATE-SHAPED PART
4: NEGATIVE-ELECTRODE TERMINAL
5: CONDUCTOR FOR CONNECTING TERMINALS
5A: ALUMINUM PLATE
5B: COPPER PLATE
6: WELDING HEAD
7: NON-AQUEOUS ELECTROLYTE SECONDARY BATTERY
7A: BATTERY CONTAINER
7B: LID PLATE
8: CONDUCTOR FOR CONNECTING TERMINALS
8A ALUMINUM MATERIAL PART

BEST MODE FOR CARRYING OUT THE INVENTION

Hereinafter, a description will be made of a conductor for connecting terminals, an assembled battery, and a method for producing the assembled battery, with reference to FIGS. 1 to 5. Note that, the same reference is marked on a component having the same function as that of a conventional example shown in FIG. 6.

Figure 1:
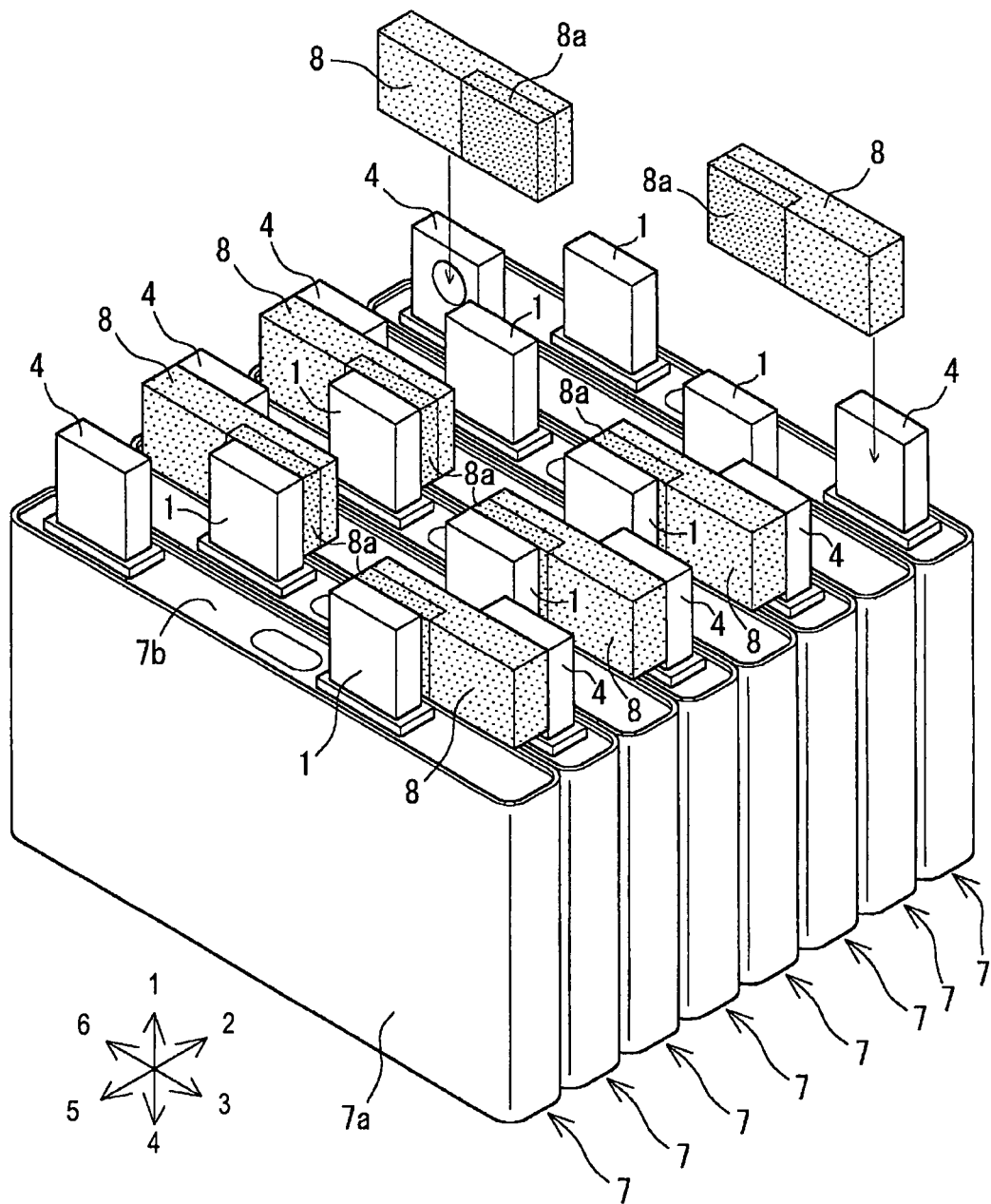
FIG. 1 shows one embodiment of the present invention, and is a perspective view showing a configuration of an assembled battery provided by connecting terminals of non-aqueous electrolyte secondary batteries in series with a conductor for connecting terminals.

FIG. 1 shows an assembled battery serving as one example of the present invention. A plurality of non-aqueous electrolyte secondary batteries 7 are arranged in their thickness direction, and a positive-electrode terminal 1 and a negative-electrode terminal 4 of the adjacent non-aqueous electrolyte secondary batteries 7 are connected in series through a conductor for connecting terminals 8, whereby the assembled battery is constituted.

In addition, in FIG. 1, the positive-electrode terminal 1, the negative-electrode terminal 4, and the conductor for connecting terminals 8 are overdrawn and each conductor for connecting terminals 8 is hatched with dots for easy understanding of the drawing. In addition, FIG. 1 shows that an arranged direction of the non-aqueous electrolyte secondary batteries 7 arranged in their thickness direction is a front-back direction, a width direction of the non-aqueous electrolyte secondary battery 7 is a right-left direction, and a height direction of the non-aqueous electrolyte secondary battery 7 is an up-down direction.

A battery exterior case of each non-aqueous electrolyte secondary battery 7 includes a rectangular-box-shaped stainless steel battery container 7a formed so that its thickness is shorter than its width, and a stainless steel lid plate 7b to cover an upper end opening part of the battery container 7a.

The battery container 7a holds a power generation component, and filled with an electrolyte solution. Furthermore, the positive-electrode terminal 1 projects upward from an upper surface of the lid plate 7b on the right side, and the negative-electrode terminal 4 projects upward from the upper surface thereof on the left side. Each of these terminals 1 and 4 is formed into a rectangular plate shape in which a surface directed in the front-back direction (thickness direction) is the largest.

The positive-electrode terminal 1 includes aluminum or an aluminum alloy, and its lower part penetrates the insulation-sealed lid plate 7b so as to be connected to a positive electrode of the power generation component held in the battery container 7a. In addition, the negative-electrode terminal 4 includes copper or a copper alloy, and its lower part penetrates the insulation-sealed lid plate 7b so as to be connected to a negative electrode of the power generation component held in the battery container 7a.

The non-aqueous electrolyte secondary batteries 7 are arranged in the front-back direction in such a manner that the largest side surfaces of the battery containers 7a are overlapped with each other. In addition, the right and left sides of the non-aqueous electrolyte secondary batteries 7 are alternately opposed so that the positive-electrode terminal 1 and the negative-electrode terminal 4 of the adjacent non-aqueous electrolyte secondary batteries 7 and 7 are close to each other.

The positive-electrode terminal 1 provided on the right side of the non-aqueous electrolyte secondary battery 7 which is arranged in first front is connected to the negative-electrode terminal 4 provided also on the right side of the second non-aqueous electrolyte secondary battery 7 which is adjacently arranged on the back side, through the conductor for connecting terminals 8.

In addition, the positive-electrode terminal 1 on the left side of the second non-aqueous electrolyte secondary battery 7 is connected to the negative-electrode terminal 4 provided also on the left side of the third non-aqueous electrolyte secondary battery 7 which is adjacently arranged on the back side, through the conductor for connecting terminals 8.

The positive-electrode terminal 1 and the negative-electrode terminal 4 of the adjacent non-aqueous electrolyte secondary batteries 7 and 7 are likewise connected through the conductor for connecting terminals 8, whereby all of the non-aqueous electrolyte secondary batteries 7 are connected in series.

Therefore, the positive-electrode terminal on the left side of the last non-aqueous electrolyte secondary battery 7 and the negative-electrode terminal 4 on the left side of the first non-aqueous electrolyte, secondary battery 7 function as external terminals of the assembled battery. In addition, in FIG. 1, the last two conductors for connecting terminals 8 are shown in a state before connected.

The conductor for connecting terminals 8 is a plate material roughly formed into a quadratic prism and includes a clad material of copper or nickel and aluminum or an aluminum alloy. The two kinds of metals of the clad material are not provided such that they are divided into two layers in the whole area in the plate thickness direction, but provided such that a part of the surface directed to the front direction in the conductor for connecting terminals 8 (right or left side in FIG. 1) is an aluminum material part 8a including aluminum or the aluminum alloy and the other part includes copper or nickel.

The conductor for connecting terminals 8 is arranged in such a manner that its largest surfaces, that is, one surface and the other surface (back surface) opposed to the one surface are directed to the front-back direction, and its longitudinal direction is directed to the right-left direction.

A region having the exposed aluminum material part 8a formed on the one surface is defined as a first region I, and a region other than the first region I formed on the one surface is defined as a second region II.

The aluminum material part 8a serving as the first region I is formed so as to be buried in a part which has been formed by dividing the surface of the conductor for connecting terminals 8 into halves in the right-left direction and making a dent in either one of the halves by almost half in the thickness direction, and the one surface is formed so that the aluminum material part 8a and the part including copper or nickel are flush with each other (they are flat). That is, the structure is provided such that there is substantially no step difference at a boundary between the first region I and the second region II.

Since the conductor for connecting terminals 8 includes the clad material having the aluminum or aluminum alloy of the aluminum material part and the metal having the melting point higher than that of the above material, contact resistance at the interface between the two materials can be lowered, and electric corrosion can be surely prevented from occurring. In addition, the conductor for connecting terminals is welded by a resistance welding method or a TIG welding method.

More specifically, the conductor for connecting terminals 8 according to the present invention is formed in such a manner that at least the plate-shaped part formed of the first metal and the plate-shaped part formed of the second metal having the melting point higher than that of the first metal are overlapped with each other, the first region I having the exposed first metal and the second region II having the exposed second metal are formed on the one surface, the second metal is formed so as to be exposed to a region opposed to the second region II, on the other surface, and there is substantially no step difference at the boundary between the first region I and the second region II in the thickness direction.

In addition, the conductor for connecting terminals 8 according to the present invention is formed such that the second metal is exposed to a region opposed to the first region I, in the other surface.

Furthermore, according to the conductor for connecting terminals 8 of the present invention, the plate-shaped part including the second metal has a pair of surfaces having almost the same thickness, and the plate-shaped part including the first metal is laminated on one part of the one surface of the above pair of surfaces, and the second metal is exposed to the other part thereof.

It is preferable that the aluminum or aluminum is selected as the first metal, and copper, nickel, iron, or an alloy containing at least one of them is selected as the second metal in this embodiment, but the first metal and the second metal can be selected optionally so as to correspond to the materials of the electrode terminals connected through the conductor for connecting terminals 8.

Figure 2:
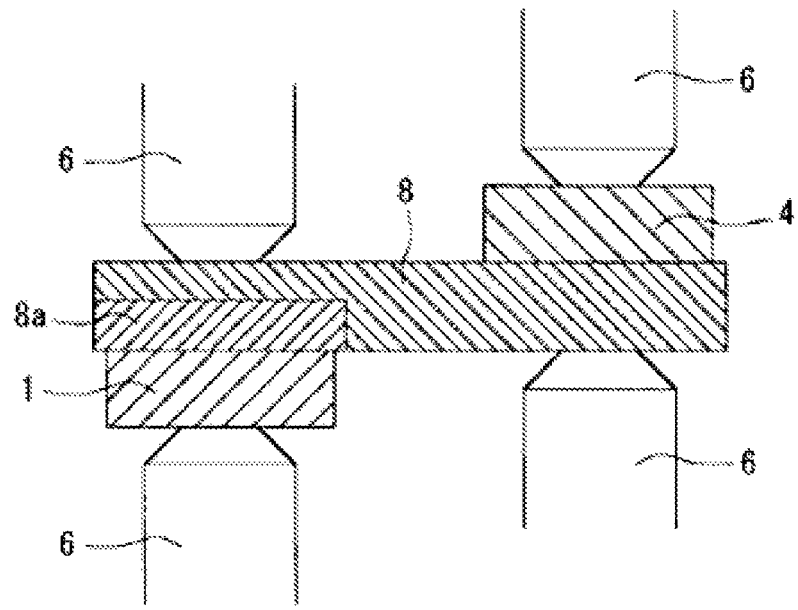
FIG. 2 shows one embodiment of the present invention, and is a partially enlarged cross-section plan view showing a welding operation for connecting and fixing the conductor for connecting terminals to a positive-electrode terminal and a negative-electrode terminal.

As shown in FIG. 2, the conductor for connecting terminals 8 is connected and fixed by the resistance welding method in such a manner that the first region I including the aluminum material part 8a is brought in contact with the positive-electrode terminal 1 of the one non-aqueous electrolyte secondary battery 7, both sides are sandwiched by the welding heads 6 and 6, and a large current is applied thereto.

That is, the welding is performed such that the welding head 6/the positive-electrode terminal 1/the conductor for connecting terminals 8/the welding head 6 are arranged in this order and the current is thereafter applied across the welding heads 6. At this time, since the aluminum material part 8a and the positive-electrode terminal 1 include the same material such as aluminum or aluminum alloy, the welding can be performed easily and surely.

In addition, since the other surface (back surface) opposed to the first region I formed on the one surface of the conductor for connecting terminals 8 includes the copper or nickel having the melting point higher than that of aluminum or aluminum alloy, there is no possibility of melting before the aluminum material part 8a melts at the time of the resistance welding.

In addition, the conductor for connecting terminals 8 is connected and fixed by the resistance welding method in such a manner that the region opposed to the second region II, on the other surface (back surface) is brought in contact with the negative-electrode terminal 4 of the other non-aqueous electrolyte secondary battery 7, both sides are sandwiched by the welding heads 6 and 6, and a large current is applied thereto.

That is, the welding is performed such that the welding head 6/the negative-electrode terminal 4/the conductor for connecting terminals 8/the welding head 6 are arranged in this order and the current is thereafter applied across the welding heads 6. At this time, since the part including the copper or nickel in the conductor for connecting terminals 8 and the negative-electrode terminal 4 including copper or copper alloy have the same or relatively close melting point and specific heat capacity, the welding can be performed easily and surely.

In addition, since the aluminum material part 8a including aluminum or aluminum alloy having the low melting point is not interposed between the welding heads 6, there is no possibility for the aluminum material part 8a to melt first like in the conventional one.

According to the above configuration, since the conductor for connecting terminals 8 can be easily and surely welded to each of the positive-electrode terminal 1 and the negative-electrode terminal 4, workability can be enhanced when the electrodes of the batteries of the assembled battery are connected and fixed. Furthermore, since the aluminum material part 8a does not project from the surface of the conductor for connecting terminals 8 and they are flush with each other, the electric corrosion is effectively suppressed because of suppression of accumulated water droplets and, so on.

Furthermore, since the aluminum material part 8a is flush with the surface of the conductor for connecting terminals 8 without projecting from it, an outline of the conductor for connecting terminals 8 is in the shape of the flat plate similar to the conventional one, so that the non-aqueous electrolyte secondary battery 7 same as the conventional one can be used and the welding can be performed in the same procedure and method. While the non-aqueous electrolyte secondary battery is used in the above embodiment, as long as the battery includes the positive-electrode terminal and the negative-electrode terminal including the metals having the different melting points, the assembled battery using the above-described conductor for connecting terminals 8 can be constituted.

In addition, the welding is performed such that the region opposed to the second region, on the other surface which is opposed to the one surface having the first region I of the conductor for connecting terminals 8 is brought in contact with the negative-electrode terminal 4 in the above embodiment. Meanwhile, in the case where the non-aqueous electrolyte secondary batteries 7 and 7 are arranged along their width direction, the positive-electrode terminal 1 and the negative-electrode terminal 4 to be connected through the conductor for connecting terminals 8 are arranged in the right-left direction, so that the first region I formed on the one surface may be welded to the positive-electrode terminal 1, and the second region II may be welded to the negative-electrode terminal 4 in that case.

Figure 3:
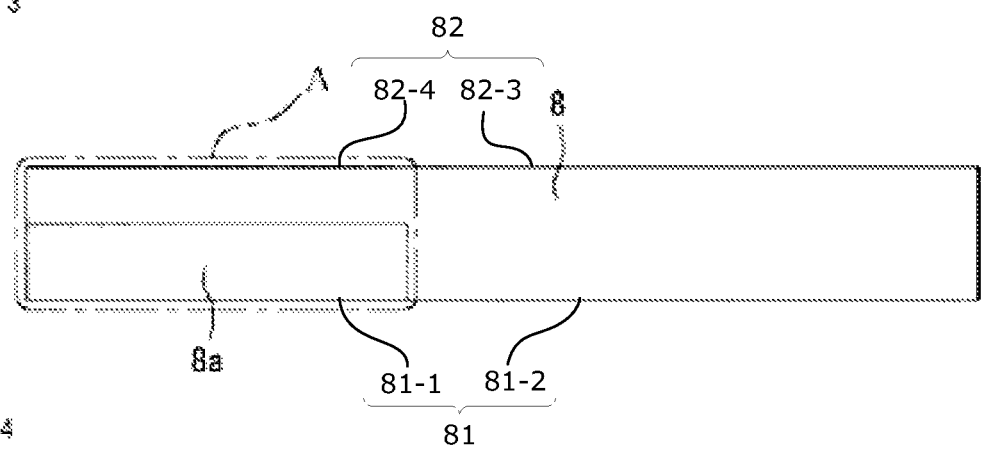
FIG. 3 shows one embodiment of the present invention, and is a plan view to explain a part of an aluminum material part in the conductor for connecting terminals.
Figure 4:
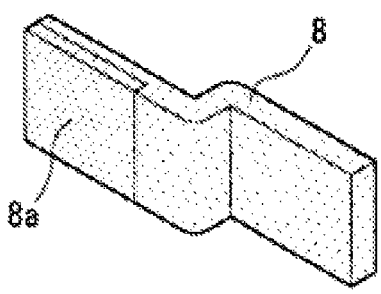
FIG. 4 shows another embodiment of the present invention, and is a perspective view showing a conductor for connecting terminals having a bent shape.
Figure 4:
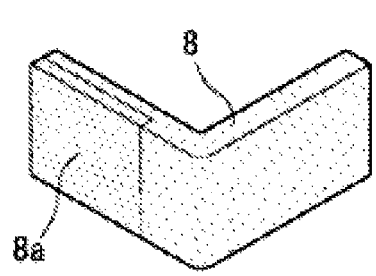

That is, as for the region other than the region having the aluminum material part 8a in the conductor for connecting terminals 8, either one of its front and back surfaces may be in contact with the negative-electrode terminal 4 and welded thereto. Here, as for the region having the aluminum material part 8a, in the case where the aluminum material part 8a is formed in the left half 81-1 of the front surface 81 of the conductor for connecting terminals 8, as shown in FIG. 3, that region includes not only the aluminum material part 8a but also a part including copper or nickel in the left half 82-4 on the back surface 82, as shown by a region A surrounded by one-dot chain line. The part except for the region A, that is, the right halves 81-2, 82-3 of the front and back surfaces 81, 82 of the conductor for connecting terminals 8 may be brought in contact with the negative-electrode terminal 4 and welded thereto.

While the description has been made of the case where the conductor for connecting terminals 8 is formed into the flat plate in the above embodiment, the shape of the conductor for connecting terminals 8 is not limited to the flat plate and may be formed into any shape, depending on the arrangement of the electrode terminals 1 and 4 to be connected.

For example, as shown in FIG. 4A, the conductor for connecting terminals 8 may be bent into a crank shape. With this conductor for connecting terminals 8, even when a distance between the positive-electrode terminal 1 and the negative-electrode terminal 4 of the non-aqueous electrolyte secondary batteries 7 and 7 is long in the front-back direction, in the assembled battery according to the present embodiment, it is not necessary to further increase the thickness of the conductor for connecting terminals 8.

For example, as shown in FIG. 4B, the conductor for connecting terminals 8 may be bent into a dogleg shape, or one or a whole part of the conductor for connecting terminals 8 may be curved so as to correspond to the arrangement of the electrode terminals 1 and 4.

While the description has been made of the case where the conductor for connecting terminals 8 includes the clad material in the above embodiment, the conductor for connecting terminals 8 is not limited to the one including the clad material. The conductor for connecting terminals 8 may be produced by attaching two kinds of metals by a step different from the step of producing the clad material.

For example, a part of one surface of a plate material including copper or nickel used for the conductor for connecting terminals 8 is notched by a machining process, and the aluminum material part 8a is formed by fitting a plate material including aluminum or an aluminum alloy in this notched part and jointing the plate material thereto by welding or brazing, or by plating with aluminum or aluminum alloy.

In addition, while the description has been made of the conductor for connecting terminals 8 formed so that there is substantially no step difference at the interface between the first region I and the second region II in the above embodiment, the conductor for connecting terminals 8 of the present invention may be formed so that the first region I projects from the surface of the second region II, or the first region I is concaved from the surface of the second region II. In addition, the conductor for connecting terminals 8 may be formed such that the aluminum material part 8a in the shape of a smaller flat plate including aluminum or aluminum alloy and is attached to a part of a surface of a flat plate including copper or nickel.

In addition, while the above embodiment shows the case where the conductor for connecting terminals 8 is used for connecting the positive-electrode terminal 1 to the negative-electrode terminal 4 of the non-aqueous electrolyte secondary batteries 7 in the assembled battery, the conductor for connecting terminals 8 can be used for connecting the positive-electrode terminal 1 of the non-aqueous electrolyte secondary battery 7 serving as the external terminal in the assembled battery, or the positive-electrode terminal 1 of the non-aqueous electrolyte secondary battery 7 used alone, to a terminal of an external device. For example, in the case where the terminal of the external device is orthogonally arranged beside the positive-electrode terminal 1 of the non-aqueous electrolyte secondary battery 7, the conductor for connecting terminals 8 bent into the dogleg shape as shown in FIG. 4B may be used.

In addition, while the above embodiment shows the case where the negative-electrode terminal 4 includes copper or copper alloy, it may include nickel or a nickel alloy, iron, steel, stainless steel, or chrome molybdenum steel in the non-aqueous electrolyte secondary battery 7 in some cases.

Nickel or nickel alloy, iron or steel, or stainless steel or chrome molybdenum steel has a melting point higher than that of aluminum or aluminum alloy, similarly to copper or copper alloy.

Thus, the part of the conductor for connecting terminals 8 other than the aluminum material part 8a may include the copper alloy, nickel alloy, iron, steel, stainless steel, or chrome molybdenum steel and the like. That is, the part of the conductor for connecting terminals 8 other than the aluminum material part 8a may include any kind of material as long as the metal material has a melting point higher than that of aluminum or aluminum alloy. Furthermore, the material may be a composite material provided by plating copper with nickel, instead of the single metal material. Still furthermore, the electrode terminals 1 and 4 may include a plated composite material, instead of the single metal material.

In addition, the description has been made of the case where the resistance welding method is used when the conductor for connecting terminals 8 is connected and fixed to the electrode terminals 1 and 4, the TIG method may be used instead of the resistance welding method.

Hereinafter, the present invention will be described in more detail.

The conductor for connecting terminals according to the present invention employs the configuration provided by overlapping, with each other, at least a plate-shaped part including a first metal and a plate-shaped part including a second metal having a melting point higher than that of the first metal.

By employing the above configuration, sufficient strength can be ensured compared with the conductor for connecting terminals having the configuration in which side surfaces of the plate-shaped parts abut to each other and welded together. As for the conductor for connecting terminals configured by welding the side surfaces abutting to each other, the welded part is separated due to mechanical vibration in some cases, so that it is difficult to satisfy connection strength and endurance required for an automotive assembled battery.

The conductor for connecting terminals according to the present invention can employ the configuration in which the plate-shaped part including the first metal is attached to the plate-shaped part including the second metal having the melting point higher than that of the first metal, or the configuration in which the plated layer of the first metal is formed on the plate-shaped part including the second metal having the melting point higher than that of the first metal. The configuration may be such that a layer is formed by evaporating the first metal, instead of the plated layer. The plated layer or the evaporated layer also becomes the thin plate-shaped part. The plate-shaped part preferably has a structure having a pair of surfaces having almost the same thickness, such as a structure having a pair of roughly parallel surfaces which are vertical in a thickness direction because the general-purpose plate material available in the market can be used.

Thus, the conductor for connecting terminals according to the present invention only has to include at least the plate-shaped part including the first metal, and the plate-shaped part including the second metal having the melting point higher than that of the first metal, so that even when the plurality of plate-shaped parts are stacked on each other, the same effect can be provided. The above configuration may be exemplified by the configuration in which aluminum/aluminum/copper, or aluminum/copper/copper are laminated in this order.

Figure 5:
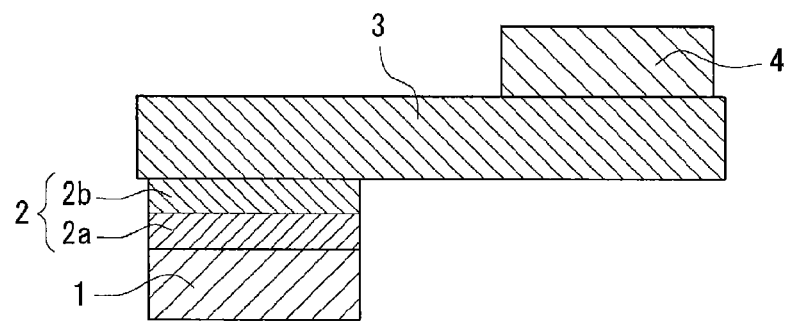
FIG. 5 shows one embodiment of the present invention, and is a partially enlarged cross-section plan view showing a structure in which a positive-electrode terminal and a negative-electrode terminal are connected by a conductor for connecting terminals including a lead plate.

FIG. 5 shows one example of such configuration. A conductor for connecting terminals is provided by laminating a lead plate 2 comprising a plate-shaped part 2a including the first metal and a plate-shaped part 2b including the second metal having a melting point higher than that of the first metal, and a plate-shaped part 3 including the second metal in this order.

An aluminum plate material is used for the plate-shaped part 2a including the first metal. A copper or nickel plate material is used for the plate-shaped part 2b including the second metal. A copper or nickel plate material having a size larger than the plate-shaped part 2b is used for the plate-shaped part 3 including the second metal.

In addition, the conductor for connecting terminals only have to have the structure in which at least the plate-shaped part including the first metal and the plate-shaped part including the second metal having the melting point higher than that of the first metal are overlapped with each other, so that one or more plate-shaped parts including a third metal having a melting point higher than that of the first metal may be stacked on each other.

In the case of FIG. 5, either one of the plate-shaped parts 2b and 3 including the second metal may include the third metal. For example, the conductor for connecting terminals may be provided by overlapping aluminum (plate-shaped part 2a)/nickel (plate-shaped part 2b)/copper (plate-shaped part 3) in this order.

In addition, as for the conductor for connecting terminals, the number of plate-shaped part including the first metal and the number of the plate-shaped part including the second metal having the melting point higher than that of the first metal are each preferably one. This is because the present invention can be realized with the simple structure at low production cost.

The conductor for connecting terminals of the present invention is preferably provided such that the plate-shaped part including the second metal includes a pair of flat surfaces having the same thickness, a pair of bent flat surfaces having the same thickness, or a pair of curved surfaces having the same thickness, the plate-shaped part including the first metal is laminated on one part of one surface of the pair of surfaces, and the second metal is exposed to the other part thereof.

This is because, the second metal having the high melting point can be designed to be arranged all over the conductor for connecting terminals. When the metal plate material having the high melting point is arranged all over the conductor for connecting terminals in the longitudinal direction, endurance of the conductor for connecting terminals against external shock can be considerably improved. In addition, when the above configuration is employed, the conductor for connecting terminals can be constituted simply at low cost with the one plate-shaped part including the second metal and the one plate-shaped part including the first metal.

The conductor for connecting terminals of the present invention preferably includes the clad material provided by attaching the plate-shaped part including the first metal and the plate-shaped part including the second metal to each other. When the above configuration is provided, connection strength between the two metals is improved, and electric resistance can be small.

According to the conductor for connecting terminals of the present invention, since the one region I having the exposed first metal, and the second region II having the exposed second metal are formed on the one surface, they can be preferably welded to the two terminals having the different melting points, on the same surface, respectively.

In the case where the positive-electrode terminal and the negative-electrode terminal to be connected include aluminum and copper, respectively, the positive-electrode terminal can be welded to the first region I, and the negative-electrode terminal can be welded to the second region II or its back surface, in the conductor for connecting terminals.

According to the conductor for connecting terminals of the present invention, since the second metal is exposed to the region opposed to the second region II formed on the one surface, in the other surface, the terminal (such as the negative-electrode terminal of the non-aqueous electrolyte secondary battery or the terminal of the external device) including the metal having the same high melting point as that of the second metal can be welded to the above region well. That is, the present invention solves the problem that the aluminum material part melts first, which conventionally occurs when the welding target sandwiched by the welding heads is welded by the resistance welding.

The conductor for connecting terminals of the present invention is constituted such that there is substantially no step difference in the thickness direction at the boundary between the first region I and the second region II. As shown in FIG. 1, the aluminum material part 8a of the conductor for connecting terminals 8 is formed on one part of the one surface of the conductor for connecting terminals 8 so as to be flush with this surface. This configuration can effectively prevent deterioration due to the electric corrosion.

This configuration can be realized by the method such as the method in which the aluminum material part is buried in the one part of the conductor for connecting terminals so as to be flush with this part, or the method in which the aluminum material part is formed by plating.

In addition, this configuration can be obtained in such a manner that the metal plate including the first metal and the metal plate including the second metal having the melting point higher than that of the first metal are subjected to a cladding process under the condition that the former plate size is made smaller. A step difference is generated when the plates are simply attached to each other, but the step difference at the interface between the two metals can be substantially eliminated by the cladding process.

Figure 6:
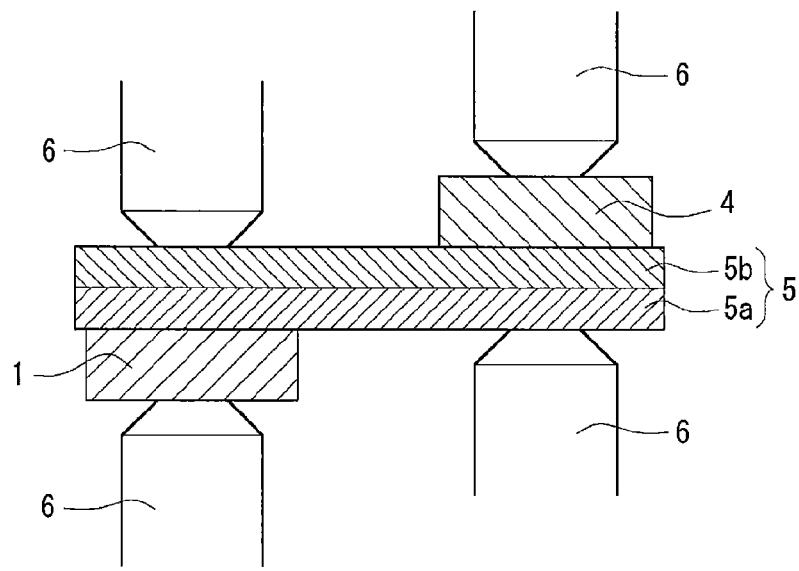
FIG. 6 shows a conventional example, and is a partially enlarged cross-section plan view showing a welding operation to connect and fix a conductor for connecting terminals entirely including a clad material, to a positive-electrode terminal and a negative-electrode terminal.

Furthermore, like the conductor for connecting terminals shown by the reference 5 in FIG. 6, the configuration in which the step difference does not substantially exist can be realized by cladding the metal plate including the first metal and the metal plate including the second metal having the same size, and thereafter removing a part of the metal plate including the first metal by a cutting process and the like performed in such a manner that at least the boundary between the first metal and the second metal is formed on an inclined surface. The part from which the first metal is removed to expose the second metal functions as the second region II.

When the surface formed after the first metal has been removed has a shape smoothly continuous over the whole processed surface, there is no step difference at the interface between the two metals. The processing method may be a chemical processing method other than the mechanical cutting method.

In addition, the configuration substantially having substantially no step difference can be also realized by notching one part of the surface of the metal plate including the second metal by machining process, fitting the metal plate including the first metal in this notched part, and thereafter performing the cladding process. When an inevitably generated step difference is at such a level that is generated in the above clad material, the effect of suppressing the electric corrosion can be sufficiently obtained.

The assembled battery of the present invention includes the battery provided with the battery exterior case, and the positive-electrode terminal and the negative-electrode terminal which project upward from the battery exterior case. When the positive-electrode terminal and the negative-electrode terminal are formed so as to project from the battery case in the same direction, a mechanical structure to connect the batteries to each other can be gathered to an upper space of the batteries, so that the assembled battery can be compactly designed.

The battery exterior case preferably has a structure in which a cylindrical side wall part is provided, and its opening parts at both ends are sealed with a bottom plate and a lid plate with a view to preventing deformation due to rise in internal pressure, and the side wall part may have a quadrangular prism shape having a rectangular box as a whole, a cylinder shape having a cross-section of a true circle, ellipse, or oval, or a shape similar to those.

The battery exterior case is made of a material which is strong enough to prevent the deformation due to the rise in internal pressure, and it is preferably made of metal. As a typical material, stainless steel can be preferably used. The battery exterior case includes the battery container and the lid plate. The battery container includes the cylindrical side wall part and the bottom plate arranged in the one opening part. The positive-electrode terminal and the negative-electrode terminal can be provided in the lid plate. These terminals are provided in the direction projecting upward from the battery case.

According to the assembled battery of the present invention, at least two batteries are arranged in the front-back direction such that the largest side surfaces of the battery containers are opposed. When this configuration is employed, the batteries can be easily fixed.

According to the assembled battery of the present invention, one or both of the positive-electrode terminal and the negative-electrode terminal of the battery are preferably in the shape of the plate. This is because when the large area surface of the plate shape is arranged so as to be directed in the front-back direction, the conductors for connecting terminals can be configured to be arranged between the positive-electrode terminals and the negative-electrode terminals in the front-back direction. When this configuration is employed, a contact area between each terminal and the conductor for connecting terminals can be largely ensured. This effect can be provided even when the thickness of the plate-shaped terminal decreases, so that the sufficient welding area can be maintained even when the battery is further thinned.

The assembled battery of the present invention is provided with the conductor for connecting terminals formed in such a manner that the plate-shaped part including the first metal and the plate-shaped part including the second metal having the melting point higher than that of the first metal are overlapped with each other, the first region having the exposed first metal and the second region having the exposed second metal are formed on the one surface, and the second metal is exposed to the region opposed to the second region, in the other surface, so that the good welding can be performed to the two terminals having the different melting points. By this effect, the non-aqueous electrolyte battery can be used as the above assembled battery.

According to the assembled battery of the present invention, the batteries are arranged such that the largest area side surfaces of the side surfaces of the battery containers are opposed to each other, the conductor for connecting terminals is arranged between the terminal of the one battery and the terminal of the other battery, the first region of the conductor for connecting terminals is connected to the opposed surface of the terminal of the one battery, and the second region or the region opposed to the second region in the other surface is connected to the opposed surface of the terminal of the other battery.

According to the above configuration, the welding between the conductor for connecting terminals and the two terminals can be easily performed, and as for both terminals having the different melting points, both terminals can be strongly and surely connected to the conductor for connecting terminals by the resistance welding method.

According to the assembled battery of the present invention, a thickness of the battery container of at least one battery is preferably 1 cm or less, and more preferably 5 mm or less. This is because when the thickness is as small as 1 cm or less, temperature control of the battery can be precisely performed. When the thickness is as small as 5 mm or less, more precise control can be implemented.

According to the method for producing the assembled battery of the present invention, the conductor for connecting terminals used for connecting the terminals is formed such that at least the plate-shaped part including the first metal and the plate-shaped part including the second metal having the melting point higher than that of the first metal are overlapped with each other, the first region having the exposed first metal and the second region having the exposed second metal are formed on the one surface, and the second metal is exposed to the region opposed to the second region, in the other surface.

With the above conductor for connecting terminals, the steps of connecting the terminals can be realized with the small number of steps as compared with the conventional one.

The method for producing the assembled battery of the present invention goes through the step of arranging the above-described conductor for connecting terminals and the terminal of the battery such that the first region I comes in contact with the terminal of the battery, arranging the pair of welding heads so as to sandwich the terminal of the battery and the conductor for connecting terminals, and applying a current from the welding head to the conductor for connecting terminals and the terminal of the battery. The terminal of the battery connected in this step preferably includes the metal having the same low melting point as the first metal.

Furthermore, the method goes through the step of arranging the conductor for connecting terminals and the terminal of the other battery such that the second region or the region opposed to the second region, in the other surface comes in contact with the terminal of the other battery, arranging the pair of welding heads so as to sandwich the terminal of the other battery and the conductor for connecting terminals, and applying a current from the welding head to the conductor for connecting terminals and the terminal of the other battery. The terminal of the battery connected in this step preferably includes the metal having the same high melting point as the second metal.

By performing both steps at the same time, the conductor for connecting terminals and both terminals can be preferably connected by one welding operation.

According to the method for producing the assembled battery of the present invention, the battery having the battery exterior case having a thickness smaller than its width and height can be preferably used. For example, a battery in the shape of a rectangular box having a thickness of 1 cm or less or 5 mm or less can be used. In this case, the positive-electrode terminal and the negative-electrode terminal of the battery are preferably provided on the upper end side of the battery exterior case, and have the plate shape. With this configuration, a contact area between each terminal and the conductor for connecting terminals can be large, and a sufficient welding area can be maintained even when the battery is thinned. In addition, as the conductor for connecting terminals, the conductor for connecting terminals of the present invention can be used.

A vehicle of the present invention includes the assembled battery of the present invention in which the conductor for connecting terminals and the terminal of the battery are strongly welded, so that the highly reliable vehicle which is superior in vibration resistance can be provided. In addition, good cooling performance can be realized due to the thinner battery, and as a result, the battery can be mounted as the assembled battery having high capacity, so that the vehicle can ensure a sufficient driving distance. More specifically, the thickness of the battery in the assembled battery can be 1 cm or less, or 5 mm or less.

In the vehicle of the present invention, the assembled battery may be used as a power supply to supply electricity to a driving motor, or may be used as a power supply of a starter motor of a driving power engine. The power engine includes a gasoline engine, diesel engine, and hydrogen-fueled engine, etc. When the vehicle has both driving motor and power engine, electricity can be supplied to both of them. A DC motor can be used as the starter motor.

In addition, the vehicle of the present invention preferably includes a charging apparatus to charge the assembled battery. The charging apparatus converts mechanical kinetic energy transmitted from the driving motor or the driving power engine, to electric energy, and it is preferably configured to charge the assembled battery by converting an AC current obtained by the power generating apparatus to a DC current. In addition, the vehicle of the present invention may include a tire, a wheel, and an instrument including a sensor for vehicle speed, and may include a clutch and an axle to transmit the power from the driving motor or the power engine to the tire.

Industrial Applicability

The battery connecting structure and the assembled battery using the structure according to the present invention can realize the easy and compact welding for connecting and fixing the terminals of the batteries with the conductor for connecting terminals, and are thus extremely useful. In addition, the present invention is extremely useful in that the assembled battery superior in welding strength can be provided with the thin battery.

The invention claimed is:

1. A conductor for connecting positive and negative electrode terminals comprising:
    a first surface including a first region having a first metal and a second region having a second metal, and
    a second surface opposite to the first surface, the second surface including a fourth region that is opposed to the first region, wherein
    a melting point of the second metal is higher than a melting point of the first metal,
    a boundary of the first region and the second region is substantially flat and exposed to an air current,
    the first metal is exposed at the first region, and
    the second metal is exposed at the second region and the fourth region.

2. The conductor according to claim 1, wherein the first metal is aluminum or an aluminum alloy.

3. The conductor according to claim 1, the second metal is one selected from a group consisting of copper, nickel, iron and an alloy containing at least one of copper, nickel and iron.

4. The conductor according to claim 1, wherein the second surface further comprises a third region that is opposed to the second region, and a thickness between the first and fourth regions and a thickness between the second and third regions are substantially equal.

5. An assembled battery comprising:
    the conductor according to claim 1; and
    at least a first battery and a second battery, each of the batteries comprising a battery container, a positive electrode terminal, and a negative electrode terminal;
    wherein the positive electrode terminal of the first battery is in direct contact with the first metal, and the negative electrode terminal of the second battery is in direct contact with the second metal.

6. An assembled battery comprising:
    at least a first battery and a second battery, each of the batteries comprising a battery container, a positive electrode terminal, and a negative electrode terminal; and
    a conductor comprising
        a first surface including a first region having a first metal and a second region having a second metal, wherein a boundary of the first region and the second region is substantially flat, and a second surface including a third region having the second metal, the second surface being opposite the first surface, wherein a melting point of the second metal is higher than a melting point of the first metal, and the second surface including a fourth region that is opposed to the first region, wherein the first metal is exposed at the first region and the second metal is exposed at the second region and the fourth region, wherein the positive electrode terminal of the first battery is in direct contact with the first region, the positive electrode terminal comprising aluminum or an aluminum alloy, and the negative electrode terminal of the second battery is in direct contact with the second region or the third region, the negative electrode terminal comprising a third metal having a melting point higher than that of aluminum or an aluminum alloy.

7. The assembled battery according to claim 6, wherein the first metal comprises at least one of aluminum and an aluminum alloy.

8. The assembled battery according to claim 6, wherein the second metal comprises at least one of copper, nickel, iron, and an alloy containing at least one of copper, nickel, and iron.

9. The assembled battery according to claim 6, wherein the third metal comprises at least one of copper, nickel, iron, and an alloy containing at least one of copper, nickel, and iron.

10. The assembled battery according to claim 6, wherein the boundary of the first region and the second region is exposed to an air current.

11. The assembled battery according to claim 6, wherein the positive electrode terminal of the first battery is connected to the first region by a welded portion.

12. The assembled battery according to claim 6, wherein the negative electrode terminal of the second battery is connected to the second region or the third region by a welded portion.

13. The assembled battery according to claim 6, wherein the positive electrode terminal of the first battery and the negative electrode terminal of the second battery terminal are plate-shaped, respectively.

14. The assembled battery according to claim 6, wherein a thickness of the battery container is 1 cm or less.

15. The assembled battery according to claim 6, wherein a thickness of the battery container is 5 mm or less.

16. The assembled battery according to claim 6, wherein each of the batteries includes a lid plate, and the positive electrode terminal and the negative electrode terminal respectively penetrate the lid plate.

\* \* \* \* \*